Figure 4:
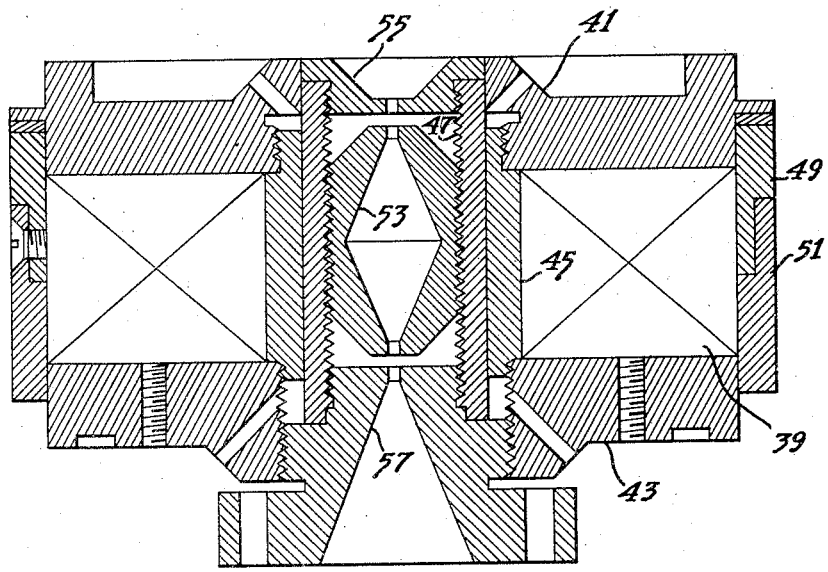

April 1, 1947. J. HILLIER ET AL 2,418,349
METHOD OF AND MEANS FOR CORRECTING FOR
DISTORTION IN ELECTRON LENS SYSTEMS
Filed Dec. 13, 1945 2 Sheets-Sheet 1
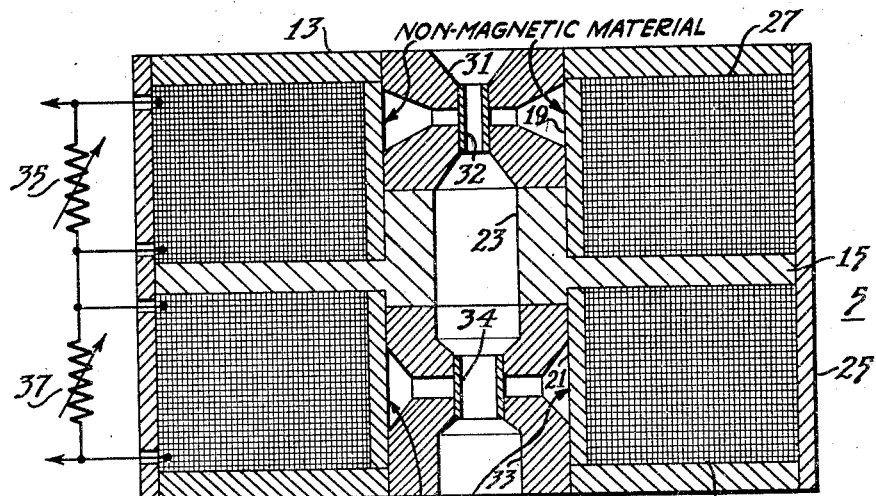
Fig. 3.
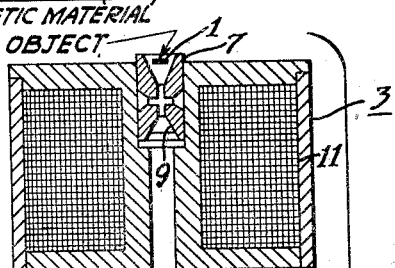
Fig. 2.
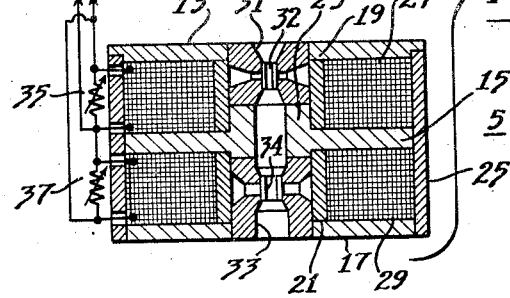
Fig. 1.
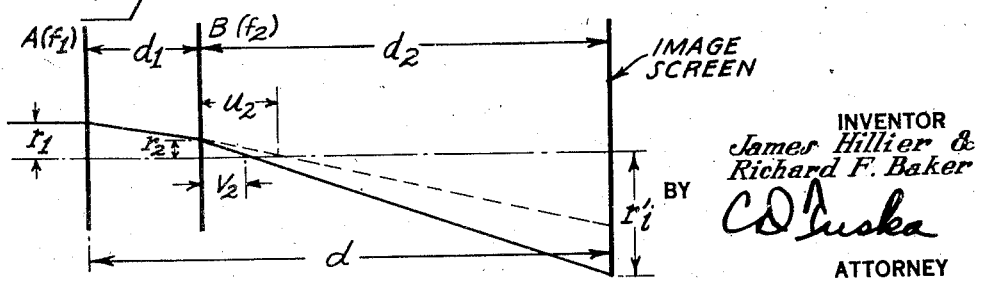
INVENTOR
James Hillier &
Richard F. Baker
BY
ATTORNEY Patented Apr. 1, 1947

2,418,349

UNITED STATES PATENT OFFICE 2,418,349

METHOD OF AND MEANS FOR CORRECTING FOR DISTORTION IN ELECTRON LENS SYSTEMS

James Hillier, Cranbury, and Richard F. Baker, Princeton, N. J., assignors to Radio Corporation of America, a corporation of Delaware Application December 13, 1945, Serial No. 634,818

10 Claims. (Cl. 250—49.5)

This invention relates generally to electron optics and more particularly to an improved method of and means for correcting for distortion in electron optical systems.

The aberrations of a simple electron lens are considerably less than those of the corresponding light optical lens. Furthermore, advantage may be taken of the very short wavelength associated with an electron beam to minimize the electron lens aberrations by radically reducing the aperture of the lens. Thus, even with a simple electron lens it is possible to produce high quality electron images with resolving powers of better than $2 \times 10^{-7}$ centimeters.

An electron microscope capable of such resolving power satisfies most requirements for investigation of the fine structure of matter beyond that observable with the light microscope. Hence, most concentrated efforts in the electron optical field have been directed towards the development of a practical operating instrument rather than to the improvement of the optics of the lens system. The fact that, in the case of the electron microscope projection lens, the aberrations produce secondary effects of a surprisingly high order of magnitude seems to have been overlooked heretofore.

Image formation by the microscope projection lens differs in many respects from that of the objective lens. In the objective a region of the specimen, small compared with the area of the lens utilized by a single pencil of electrons, is imaged by pencils of electrons having an angular aperture of the order of $3 \times 10^{-3}$ radians. The term "pencil" is employed to designate those electronic rays which take part in the imaging of a single point of the specimen.

All points of the electronic image are diffused by the spherical and chromatic aberrations of the lens, while the off-axis points are displaced and further diffused by the additive effects (by root mean square) of other third order aberrations. Actually, because the diameter of the field of view is small, the latter effect is almost negligible. The image produced by the objective constitutes the "object" for the projection lens. The area of the object, in this case, is relatively large compared with the area of the projection lens utilized by a single electronic pencil. If the individual pencils utilized in the projection lens have an extremely small angular aperture ($10^{-5}$ radians), none of the third order aberrations appears as an observable diffusion of the image. Thus, the aberrations of the projection lens cannot reduce to an appreciable extent the resolving power of the system. The combined effects of chromatic change in magnifications and in rotation (in a magnetic electron lens) may be considered as an exception to this rule. However, these effects affect only the outer zones of the image and are smaller in general than the defocusing of the entire image caused by the simultaneously occurring chromatic aberrations of the objective.

Instead the aberrations of the projection lens appear as a displacement of the image points from the Gaussian or true positions, that is they appear as a distortion. When the projection lens is considered as a very thin lens, the conditions of imaging are such that the spherical aberrations alone are responsible for this distortion. In the case of a magnetic lens there also is a very slight rotational distortion of the image.

In addition to the fact that distortion in electron microscope projection images is undesirable from an aesthetic point of view, almost undetectable amounts may produce difficulties in the production of good stereoscopic images and may lead to completely erroneous results if the microscope is employed for the accurate determination of particle size distributions. The principal distortion is of the pin-cushion variety wherein the scalar values vary as a function of the radial displacement of the image points.

Since even a small amount of distortion may produce serious error in the accurate determination of particle size distribution, it heretofore has been necessary to calibrate the image field before making critical particle size determinations. The instant invention contemplates an improved method of and means for correcting for such distortion in an electron projection lens whereby such calibration is unnecessary. It has been observed that the distortion of magnetic projection lenses is dependent upon the spacing of the pole pieces, being reduced as the spacing is increased. This effect is supported by theoretical considerations of spherical aberration. While the improvement attainable is appreciable, it is accomplished by a considerable loss of magnification. Hence, in practice the system to be described herein has been found to offer a satisfactory and practical solution of the problem.

In a paper entitled "Miscellaneous Research on Electron Microscope Parameters" presented before the Electron Microscope Society of America on January 14, 1944, by J. Hillier and R. F. Baker, it was revealed that the use of a double projection lens, with the first lens situated between the second lens and its object side focal point, provided some correction of image distortion if the strengths of the two lenses were carefully adjusted. However, the system thus described necessitated a specially constructed double projection lens winding and an additional regulated current supply.

In the instant case a mathematical study of such a general type of system has been made to show that it is possible to obtain any desired degree of correction with a properly adjusted double projection lens system, and that in practice it is possible to design a distortion free projection lens pole piece system energized by a common lens winding.

Among the objects of the invention are to provide an improved method of and means for increasing the resolution of an electron optical system. Another object is to provide an improved method of and means for correcting for distortion in an electron optical system. An additional object is to provide an improved double lens electron optical system in which pin-cushion distortion is substantially eliminated. A further object of the invention is to provide an improved double electron optical magnetic lens system energized from a common current supply for correcting for lens distortion. An additional object is to provide an improved magnetic electron lens system comprising two axially disposed magnetic lenses having a common energizing winding wherein the lenses are proportioned substantially to eliminate lens distortion.

Other objects of the invention include the provision of an improved method of and means for proportioning a double electron projection lens system wherein the plane of one of said lenses is at the focus of the other of said lenses, and the focal length of said one of said lenses is of the order of 3 percent greater than the focal length of the other of said lenses for compensating for pin-cushion distortion in said lenses. An additional object of the invention is to provide an improved method of and means for correcting for distortion in a double magnetic electron lens system wherein the strengths of said lenses differ by a relatively small amount and wherein the plane of one of said lenses is located at the focus of the other of said lenses.

Figure 5:
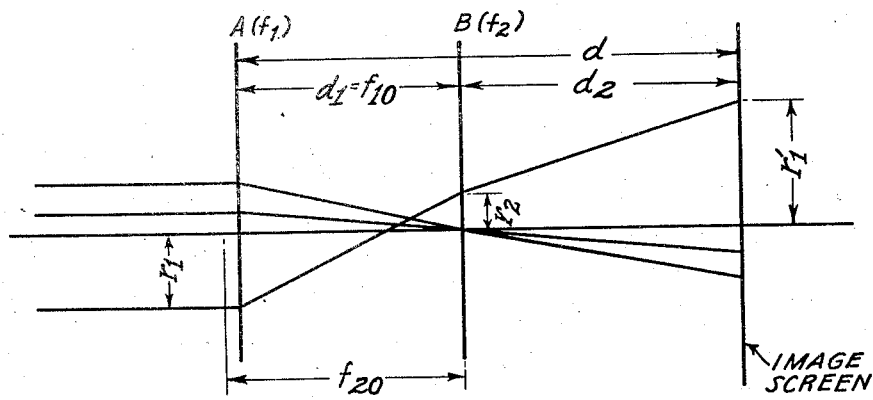

The invention will be described in greater detail by reference to the accompanying drawings of which Figure 1 is an electron ray diagram of a general example of an electron optical system according to the invention; Figure 2 is a cross-sectional elevational view of an objective-projection lens system as employed in an electron microscope; Figure 3 is a cross-sectional elevational view of the structural details of a double magnetic projection lens having separate energizing windings and proportioned according to the invention; Figure 4 is a cross-sectional elevational view of a preferred embodiment of a double magnetic projection lens having a common energizing winding and proportioned in accordance with the invention; and Figure 5 is an electron ray diagram illustrating the preferred proportions for an electron optical system providing substantially complete correction for pin-cushion distortion. Similar reference characters are applied to similar elements throughout the drawings.

Referring to the drawings, Figure 1 is a ray diagram indicating the significance of the various symbols employed in the mathematical treatment of the invention described hereinafter. The system consists of two projection lenses having paraxial focal lengths $f_{10}$ and $f_{20}$, the lens planes A and B being separated by a distance $d_1$. The image produced by objective lens and remagnified by said two projection lenses consists of pencils of electrons which are essentially parallel to the axis and which have extremely small angular aperture ($10^{-5}$ radians). For all practical purposes these pencils each may be considered as single rays leaving a point at an infinite distance from the lens. In critical work, however, it is necessary to consider the fact that the objective lens is normally at a finite distance $u_1$ from the projection lenses in which case $u_1$ is substituted for $f_1$ in the following formulae.

Since the distortion only is considered, the problem involves determining the characteristics of the second lens which will make the radius $r'_1$ a linear function of $r_1$. From the geometry of Figure 1 it can be seen that $$r_2 = r_1(f_1 - d_1)/f_1 \qquad (1)$$

$$r'_1 = r_2(d - d_1 - v_2)/v_2 \qquad (2)$$

Then if the simple lens formula $1/v - 1/u = 1/f$ is assumed to hold for both lenses, equation (2) becomes, after multiplying and collecting terms:

$$r'_1 = r_1\left[(d-d_1)\left(\frac{1}{f_1}+\frac{1}{f_2}\right) - \frac{d_1(d-d_1)}{f_1 f_2} + \frac{d_1}{f_1} - 1\right] \qquad (3)$$

Because of spherical aberration $f_1$ and $f_2$ depend on $r_1$ and $r_2$, respectively, according to the relations $$f_1 = f_{10}(1 - k_1 r_1^2) \text{ and } f_2 = f_{20}(1 - k_2 r_2^2) \qquad (4)$$

where $k_1$ and $k_2$ are the spherical aberration constants. The constant $k$ utilized herein is more convenient for considering spherical aberration in electron lenses than the commonly employed spherical aberration coefficient C of light optics. C is a dimensionless constant for a lens of fixed focal length. However, one of the advantages of electron optics is the fact that the focal lengths of the lenses are variable over wide ranges, in which case the use of C becomes cumbersome and leads to difficulties in the interpretation of experimental results. The constant $k$, on the other hand, is independent of the focal length except where lens saturation effects are encountered in magnetic lenses. The two coefficients are related by the equation $kf^3 = Cf$.

Substituting equations (4) and $f_1$ and $f_2$ in equation (3) leads to $$r'_1 = r_1(d-d_1)\frac{1+k_1 r_1^2}{f_{10}} + \frac{(1+k_2 r_2^2)}{f_{20}} - \frac{d_1(d-d_1)}{f_{10} f_{20}} \times$$

$$(1 + k_1 r_1^2 + k_2 r_2^2) + \frac{d_1}{f_{10}}(1 + k_1 r_1^2) - 1 \qquad (5)$$

where $k_1 r_1^2$ and $k_2 r_2^2$ are small compared to 1 in view of the experimental values obtained for these quantities. Collecting coefficients of $k_1 r_1^2$ and $k_2 r_2^2$ results in an expression of the form $$r'_1 = r_1(A_0 + A_1 k_1 r_1^2 + A_2 k_2 r_2^2) \qquad (6)$$

Hence, to make $r'_1$ a linear function of $r_1$, it is necessary to equate the coefficients of the higher powers of $r_1$ and $r_2$ to zero, that is $$A_1 = \frac{d-d_1}{f_{10}} - \frac{d_1(d-d_1)}{f_{10} f_{20}} + \frac{d_1}{f_{10}} = 0 \qquad (7)$$

$$A_2 = \frac{d-d_1}{f_{20}} - \frac{d_1(d-d_1)}{f_{10} f_{20}} = 0 \qquad (8)$$

Solving Equations 7 and 8 for $f_{10}$ and $f_{20}$ gives $$f_{10} = d_1 \qquad (9)$$

$$f_{20} = \frac{d_1(d-d_1)}{d} = \frac{f_{10}(d-f_{10})}{d} \qquad (10)$$

Thus, it may be seen that a first order correction of distortion can be made by the use of two lenses where the second lens is placed at the focal point of the first lens and has a focal length given by equation (10). Since $f_{10} << d$, the focal lengths of the two lenses are very nearly equal and in practice differ by about 3 percent. It should also be noted that the conditions for correction are independent of the spherical aberration of either lens.

To investigate the degree of correction attained by the method described heretofore, it is essential to return to the complete expression (2) which on substituting $u_2$ and making use of equation (1) becomes $$\frac{r'_i}{r_1} + 1 = \frac{d - d_1}{f_2} \frac{r_2 + d}{r_1 + f_1} \quad (11)$$

In order to simplify the notation $$\frac{r_2}{r_1} = \frac{f_1 - d_1}{f_1}$$

will be written as $\epsilon$. Then equation (11) may be written as $$\left(\frac{D_c}{100} + 1\right) M + 1 = \frac{(d - d_1)\epsilon}{f_2} + \frac{d(1 - \epsilon)}{d_1} \quad (12)$$

where $$M = \frac{r_i}{r_1}$$

is the undistorted magnification of the system. If the values for the corrected system are introduced, it is also possible to state that $$r_1^2 = -\epsilon/k_1(1 - \epsilon) \quad (13)$$

$$r_2^2 = -\epsilon^3/k_1(1 - \epsilon) \quad (14)$$

whereupon the complete expression for $f_2$ becomes $$f_2 = \frac{d_1(d - d_1)}{d}\left[1 + \frac{k_2 \epsilon^3}{k_1(1 - \epsilon)}\right] \quad (15)$$

Substituting equation (15) in equation (12) and rearranging the terms provides $$\frac{D_c}{100} = -\left(1 + \frac{1}{M}\right)\left[\frac{\frac{k_2}{k_1}\frac{\epsilon^4}{1 - \epsilon}}{1 + \frac{k_2}{k_1}\frac{\epsilon^3}{1 - \epsilon}}\right] \quad (16)$$

Since $$\epsilon = \frac{-k_1 r_1^2}{1 - k_1 r_1^2} \text{ and } k_1 r_1^2 >> 1$$

the expression (16) indicates that a system corrected by the application of the relations (9) and (10) provides an image which deviates from the true image only in the fourth power of the small quantity $k_1 r_1^2$.

Even more complete correction may be obtained under the previous assumptions if only the condition (9) is imposed on equation (12) whereby $$\left(\frac{D_c}{100} + 1\right) M + 1 = \frac{d}{d_1} + \epsilon\left[\frac{d - d_1}{f_{20}\left(1 + \frac{k_2}{k_1}\frac{\epsilon^3}{1 + \epsilon}\right)} - \frac{d}{d_1}\right] \quad (17)$$

In this case a more accurate value of $f_{20}$ may be obtained by making the coefficient of $\epsilon$ equal to zero for $\epsilon$ equal to its maximum possible value $\epsilon_{max}$ in any practical example, that is $$f_{20} = \frac{d_1(d - d_1)}{d\left[1 + \frac{k_2}{k_1}\frac{\epsilon^3_{max}}{1 - \epsilon_{max}}\right]} \quad (18)$$

The ray diagram illustrated in Figure 5 of the drawing is characteristic of the optics of a double lens projection system wherein $d_1 = f_1$ and $f_2 = 1.03 f_1$ which has been found to be a practical application of the invention.

A practical realization of a double projection lens system according to the invention which fulfils the conditions enumerated heretofore may be readily accomplished if the two portions of the projection lens are excited independently. Unfortunately this requires a special double winding structure and an additional regulated source of energizing current to be readily adaptable to existing electron microscopes. A practical embodiment of the invention utilizing a double-winding dual projection lens in combination with a conventional electromagnetic objective lens is illustrated in Figure 2. A microspecimen or object 1 placed at the focus of the objective lens 3 is magnified by the objective lens to form an intermediate image which is further magnified by the double projection lens 5. The objective lens may be of any conventional electromagnetic or electrostatic design. The illustrated lens includes pole pieces 7 and 9 secured in spaced parallel relation energized by a winding 11.

The double projection lens structure 5, shown in greater detail in Figure 3, includes annular magnetic members 13, 15 and 17 which are secured in spaced parallel relation normal to a pair of non-magnetic cylinders 19, 21. The inner annular member 15 has an inwardly extending magnetic portion 23 which is a hollow cylinder. The outer portions of the annular members engage an outer hollow cylinder 25 which is of magnetic material. The spaces between the annular members 13—15 and 15—17 include separate field windings 27, 29, respectively. It will be noted that the inwardly extending portion or hollow cylinder 23 is shorter than the outer hollow cylinder 25. The upper space and the lower space between the ends of the inner cylinder 23 and the annular members 13 and 17 are machined to fit, respectively, the upper and lower pole pieces 31, 33. The pole pieces are preferably, but not necessarily, made in accordance with the method disclosed in U. S. Patent 2,292,877 granted to James Hillier on August 11, 1942. In general, the objective and double projection lenses may be constructed in accordance with the method disclosed in U. S. Patent 2,323,328 granted to applicant James Hillier on July 6, 1943.

It is highly desirable to avoid any eccentricity of the pole pieces or magnetic structure. One suitable method is first to bore the aperture in the inner portion 23 of the magnetic structure. The non-magnetic cylinders 19, 21 and the annular members 13, 15, 17 are then secured by soldering or equivalent means to the inner portion of the lens which may be mounted on an arbor so that the several parts may be machined on common centers to insure concentricity. Since the pole pieces may be machined concentrically as disclosed in the aforementioned Patent 2,292,877, it follows that the entire lens structure may be made concentric. Preferably, the pole pieces should include inner cylindrical non-magnetic liners 32, 34.

The windings 27, 29 may be connected to a source of regulated current, not shown, and to separate current controlling means such as adjustable resistors 35, 37 which may be serially or shunt connected with the windings as desired. In either case, it is preferable to employ connections in which the magnetic fields of the lenses are opposed. This tends to prevent rotation of the image with varying magnification. If image rotation is not objectionable, the connections for aiding fields may be used. Once the ratio of the currents in the two windings has been determined in accordance with the principles described heretofore, the desired relative magnetizing forces at the upper and lower pairs of pole pieces will be determined. Thereafter, the total current supplied to the two lenses may be regulated by a single control, not shown, to vary the size of the field and the magnification according to known electron optical principles.

Figure 4 shows an alternative double lens construction employing a common excitation winding 39. The structure comprises annular end portions 41, 43 supported by a non-magnetic cylindrical center support 45 to which the annular end members are threaded. An internally threaded non-magnetic sleeve 47 is fitted into the cylindrical supporting member 45. Outer interlocked cylindrical magnetic supporting members 49, 51 connect the annular end members 41, 43. An inner common lens pole piece assembly 53 threaded to the inner supporting member 47 may be longitudinally adjusted with respect to the separate lens pole pieces 55 and 57 which also are threaded into the inner threaded supporting member 57. Thus, the pole piece spacing of both of the lens elements may be separately adjusted with respect to each other and with respect to the magnetic supporting structure energized by the common winding 39. Since the focal length and the magnification of each of the lens structures is dependent upon the spacing between adjacent pole pieces, such flexibility of adjustment is essential for preliminary adjustment of the two lenses in accordance with the principles enumerated heretofore for elimination of distortion in the projection lens assembly.

Tests conducted with double magnetic projection lenses employing flat-face pole pieces having inherently high distortion indicate that a single projection lens of this type may be expected to have a spherical aberration constant value of $k_1 = 42.5$ cm.$^{-2}$ as compared with customary projection lens aberration constants of 6 to 8 cm.$^{-2}$. However, even for the high distortion lens structure employed in such tests, it has been found that the factor $e^4$ in equation (16) will have a maximum value of only $10^{-4}$. The value of $k_1$ has been found to be substantially independent of lens strength except at high values when portions of the lens become saturated. It should be emphasized that while radial distortion is substantially eliminated when a double magnetic projection lens is energized in accordance with the invention, some rotational distortion will remain due to the fact that the strength of the two portions of the projection lens is necessarily slightly different in order to obtain the required correction for radial distortion. However, such rotational distortion is usually of negligible magnitude.

Thus, the invention disclosed comprises an improved method of and means for correcting for radial distortion in electron optical projection lenses. Suitable structure for a double electromagnetic projection lens assembly has been disclosed employing either separate or common excitation windings. It has been shown that, both theoretically and practically, it is possible to design and operate a projection lens system for an electron microscope in which radial or pin-cushion distortion due to spherical aberration in the projection lens is reduced to negligible proportions.

We claim as our invention:

1. An electron lens system including, in combination, a pair of electron lenses for focusing an electron beam passing therethrough, the plane of one of said lenses being between the plane and the focus of the other of said lenses, and means for controlling the energization of said lenses whereby the aforementioned relation is established and the distortion of said lenses is substantially neutralized.

2. An electron lens system including, in combination, a pair of electron lenses for focusing an electron beam passing therethrough, the plane of one of said lenses being between the plane and the focus of the other of said lenses, and means for controlling separately the energization of said lenses whereby the aforementioned relation is established and the distortion of said lenses is substantially neutralized.

3. An electron lens system including, in combination, a pair of electron lenses, means for energizing said lenses to focus an electron beam passing therethrough, the plane of one of said lenses being between the plane and the focus of the other of said lenses, and means including said energizing means for controlling the energization of said lenses whereby the aforementioned relation is established and the distortion of said lenses is substantially neutralized.

4. An electron lens system including, in combination, a pair of coaxially-disposed electromagnetic electron lenses, means for energizing said lenses to focus an electron beam passing therethrough, the plane of one of said lenses being between the plane and the focus of the other of said lenses, and means including said energizing means for controlling the energization of said lenses whereby the aforementioned relation is established and the distortion of said lenses is substantially neutralized.

5. An electron lens system including, in combination, a pair of electron lenses, means for energizing said lenses to focus an electron beam passing therethrough, the plane of one of said lenses being between the plane and the focus of the other of said lenses, and means including said energizing means for controlling the energization of said lenses, the field of said one of said lenses being substantially weaker than the field of said other of said lenses whereby the aforementioned relation is established and the distortion of said lenses is substantially neutralized.

6. An electron lens system including, in combination, a pair of electron lenses, means for energizing said lenses to focus an electron beam passing therethrough, the plane of one of said lenses being disposed substantially at the focus of the other of said lenses, and means including said energizing means for controlling the energization of said lenses whereby the aforementioned relation is established and the distortion of said lenses is substantially neutralized.

7. A system as defined in claim 6 wherein the focal length of said one lens is of the order of three percent greater than the focal length of said other lens.

8. An electron lens system including, in combination, a pair of electron lenses, an image screen, means for energizing said lenses to focus an electron beam passing therethrough, the plane of one of said lenses being disposed substantially at the focus of the other of said lenses, the focal length of said one of said lenses being equal to the ratio of the product and the sum of the distances between the planes of said lenses and the distance from said one lens to said screen, and means including said energizing means for controlling the energization of said lenses whereby the aforementioned relation is established and the distortion of said lenses is substantially neutralized.

9. An electron lens system including, in combination, a pair of electron lenses, an image screen, means for energizing said lenses to focus an electron beam passing therethrough, the plane of one of said lenses being disposed substantially at the focus of the other of said lenses, the focal length of said one lens being substantially equal to $$\frac{d_1(d-d_1)}{d\left[1+\frac{k_2}{k_1}\frac{\epsilon^3_{max}}{1-\epsilon_{max}}\right]}$$

$$\frac{k_1 r_1^2}{1-k_1 r_1^2}$$

where $d$ is the distance between the planes of said lenses, $d_2$ is the distance from the plane of said one lens to said screen, $k_1$ and $k_2$ are constants depending upon the lens aperture radial dimensions, and $\epsilon_{max}$ is equal to $$\frac{k_1 r_1^2}{1-k_1 r_1}$$

for the maximum value of $r_1$ where $r_1$ is the aperture radius of the other of said lenses, and means including said energizing means for controlling the energization of said lenses whereby the aforementioned relation is established and the distortion of said lenses is substantially neutralized.

10. An electron lens system including, in combination, a pair of electromagnetic electron lenses, unitary winding means for commonly energizing said lenses to focus an electron beam passing therethrough, the plane of one of said lenses being between the plane and the focus of the other of said lenses, and means including said energizing means for controlling separately the energization of said lenses whereby the aforementioned relation is established and the distortion of said lenses is substantially neutralized.

JAMES HILLIER.
RICHARD F. BAKER.

REFERENCES CITED

The following references are of record in the file of this patent:

UNITED STATES PATENTS

| Number | Name | Date |
| --- | --- | --- |
| 2,292,877 | Hillier | Aug. 11, 1942 |
| 2,323,328 | Hillier | July 6, 1943 |

Certificate of Correction

Patent No. 2,418,349                          April 1, 1947

JAMES HILLIER ET AL.

It is hereby certified that errors appear in the printed specification of the above numbered patent requiring correction as follows:

Column 4, line 62, for "of r₁" read *of* $r_1$; column 5, lines 16 and 17, for the equation reading $$\frac{d-d_1}{f_2}\frac{r_2+d}{r_1+f_1} \quad \text{read} \quad \frac{d-d_1}{f_2}\frac{r_2}{r_1}+\frac{d}{f_1}$$

column 9, lines 17 to 19 inclusive, strike out the equation reading $$\frac{k_1 r_1^2}{1-k_1 r_1^2}$$

lines 25 to 27 for $$\frac{k_1 r_1^2}{1-k_1 r_1} \quad \text{read} \quad \frac{k_1 r_1^2}{1-k_1 r_1^2}$$

and that the said Letters Patent should be read with these corrections therein that the same may conform to the record of the case in the Patent Office.

Signed and sealed this 7th day of February, A. D. 1950.

[SEAL]

THOMAS F. MURPHY,
                                   *Assistant Commissioner of Patents.*